United States Patent [19]

Rehm

[11] 3,881,003

[45] Apr. 29, 1975

[54] COMPOSITIONS CONTAINING 3-SULFANILAMIDO-4,5-DIMETHYLISOXAZOLE AND A TRIMETHOXYBENZYL PYRIMIDINE

[75] Inventor: Walter Rehm, Riehen, Switzerland

[73] Assignee: Hoffmann-La Roche Inc., Nutley, N.J.

[22] Filed: Mar. 12, 1973

[21] Appl. No.: 340,039

[30] Foreign Application Priority Data
Mar. 16, 1972 Switzerland.......................... 3930/72

[52] U.S. Cl. ............................................... 424/229
[51] Int. Cl............................................. A61k 27/00
[58] Field of Search ...................................... 424/229

[56] References Cited
UNITED STATES PATENTS

| | | |
|---|---|---|
| 3,341,541 | 9/1967 | Hoffer................................ 424/229 |
| 3,485,840 | 12/1969 | Hoffer................................ 424/229 |
| 3,515,783 | 6/1970 | Grunberg........................... 424/229 |
| 3,551,564 | 12/1970 | Klaui et al. ........................ 424/229 |

OTHER PUBLICATIONS

Hoffman–La Roche, Chem. Abst., Vol. 61 (1964), p. 16069f.

*Primary Examiner*—Sam Rosen
*Attorney, Agent, or Firm*—Samuel L. Welt; Jon S. Saxe; William M. Farley

[57] ABSTRACT

Antibacterial compositions containing 3-sulfanilamido-4,5-dimethylisoxazole and 2,4-diamino-5-(3,4,5-trimethoxybenzyl)-pyrimidine wherein the sulfonamide has a prolonged half-life in blood plasma are described.

12 Claims, No Drawings

COMPOSITIONS CONTAINING 3-SULFANILAMIDO-4,5-DIMETHYLISOXAZOLE AND A TRIMETHOXYBENZYL PYRIMIDINE

BACKGROUND OF THE INVENTION

The sulfonamides and salts thereof with pharmaceutically acceptable bases are known antibacterial compounds. Further, it is known that the combination of 5-sulfanilamido-3,4-dimethylisoxazole and 2,4-diamino-5-(3,4,5-trimethoxybenzyl)-pyrimidine is medicinally effective in the chemotherapeutic treatment of bacterial infections which have been clinically demonstrated to be non-responsive to therapy with the sulfonamide alone. Unexpectedly, it has now been discovered that the combination of the therapeutical compounds of this invention, i.e. 3-sulfanilamido-4,5-dimethylisoxazole and 2,4-diamino-5-(3,4,5-trimethoxybenzyl)-pyrimidine, not only is medicinally effective in veterinary medicine in the chemotherapeutic treatment of bacterial infections but also is beneficial in providing a much longer half-life of the sulfonamide in blood plasma than other sulfonamides, thus enabling the use of relatively low dosages of the combination.

2,4-Diamino-5-(3,4,5-trimethoxybenzyl)-pyrimidine and a process for the preparation thereof are disclosed in U.S. Pat. No. 2,909,522.

3-Sulfanilamido-4,5-dimethylisoxazole is prepared by the oxidation of 3-methyl-amino-4,5-dimethylisoxazole to 3-amino-4,5-dimethylisoxazole which is subsequently treated with p-acetamidobenzenesulfonyl chloride in pyridine. The resulting product is hydrolyzed to 3-sulfanilamido-4,5-dimethylisoxazole.

DETAILED DESCRIPTION OF THE INVENTION

In its most comprehensive embodiment, the present invention relates to pharmaceutical compositions containing 3-sulfanilamido-4,5-dimethylisoxazole or a salt thereof with a pharmaceutically acceptable base (compound A) and 2,4-diamino-5-(3,4,5-trimethoxybenzyl) pyrimidine or salt thereof with a pharmaceutically acceptable acid (compound B).

In a more particular embodiment, the invention relates to veterinary compositions, in solution or animal feedstuff or premix, which comprise 3-sulfanilamido-4,5-dimethylisoxazole or a salt thereof with a pharmaceutically acceptable base and 2,4-diamino-5-(3,4,5-trimethoxybenzyl) pyrimidine or a salt thereof with a pharmaceutically acceptable acid.

Still further embodiments of this invention are the formulations of animal feeds containing the potentiated sulfonanide composition and the use of such a composition in the treatment and control of bacterial infections in animals.

The expression "a salt thereof with a pharmaceutically acceptable base" denotes the salts formed by admixing 3-sulfanilamido-4,5-dimethylisoxazole with a suitable base, preferably an alkali metal base, such as sodium hydroxide, potassium hydroxide and the like.

The expression a salt thereof with a pharmaceutically acceptable acid denoted the salts formed by admixing 2,4-diamino-5-(3,4,5-dimethoxybenzyl) pyrimidine with a suitable mineral acid such as hydrochloric acid, sulfuric acid, phosphoric acid, etc. or an organic acid such as acetic acid, citric acid, lactic acid, maleic acid, salicyclic acid and the like.

The compositions of this invention have been found to be effective against many gram-positive and gram-negative bacteria and especially against *Salmonella typhosa*, *Salmonella schottnuelleri*, *Streptococcus pyogenes*, *Streptococcus agalactiae*, *Pseudomonas aeruginosa*, *Staphyloccus aureus*, *Escherichia coli*, *Pasteurella multocida* and *Diplococcus pneumoniae*.

The compositions are used in veterinary medicine as a medicament for the prophylactic and therapeutic treatment of infections of animals such as pigs, goats, sheep, cows, especially calves, horses, dogs, cats, poultry, fish and other experimental and zoo animals.

The weight ratio of the therapeutically active components used in the compositions of this invention can vary within rather wide limits. Generally, the compositions of this invention contain from about 0.05 to about 20 parts of 3-sulfanilamido-4,5-dimethylisoxazole or an equivalent amount of a salt thereof with a pharmaceutically acceptable base to one part of 2,4-diamino-5-(3,4,5-trimethoxybenzyl) pyrimidine or an equivalent amount of a salt thereof with a pharmaceutically acceptable acid. Preferably, the weight ratio is from about 1 to about 20 parts of 3-sulfanilamido-4,5-dimethylisoxazole or an equivalent amount of a salt thereof with a pharmaceutically acceptable base to one part of 2,4-diamino-5-(3,4,5-trimethoxybenzyl) pyrimidine or an equivalent amount of a salt thereof with a pharmaceutically acceptable acid. Especially preferred is a weight ratio in the composition of from about 5 to about 9 parts of 3-sulfanilamido-4,5-dimethylisoxazole or an equivalent amount of a salt thereof with a pharmaceutically acceptable base to one part of 2,4-diamino-5-(3,4,5-trimethoxybenzyl) pyrimidine or an equivalent amount of a salt thereof with a pharmaceutically acceptable acid.

The compositions of this invention are ultimately embodied in forms employing organic and inorganic carrier materials which are suitable for use in veterinary medicine either for enteral or parenteral administration.

Injection is the preferred form of administration. Such preparations are made by dissolving the components of the composition in a water/organic, water-miscible solvent system. The components, 3-sulfanilamido-4,5-dimethylisoxazole dissolved in aqueous sodium hydroxide and 2,4-diamino-5-(3,4,5-dimethoxybenzyl) pyrimidine dissolved in an organic solvent, are admixed and the pH of the resulting solution is adjusted to 8-10. Examples of suitable water-miscible organic solvents are polyethylene glycol ethers of tetrahydrofurfuryl alcohol having about 3 mols of ethylene oxide per mol of alcohol, dimethylformamide, dimethylsulfoxide, dimethylacetamide, diethylacetamide, 1,2-propylene glycol, dipropylene glycol and 1,3-butylene glycol. Especially preferred solvents are glycerineformal (25% 4-hydroxymethyl-1,3-dioxolane and 75% 5-hydroxy-1,3-dioxane) and polyethylene glycols containing 2-15 ethylene oxide groups, i.e., diethylene glycol.

The concentration of 3-sulfanilamido-4,5-dimethylisoxazole in the injection solutions to be an effective antibacterial agent can range from about 1% to about 40% by weight with the preferred range being between 10% and 30% by weight. The water in the injection solutions can range from about 5% to about 50% by weight while the water-miscible organic solvent can range from about 30% to about 80% by weight.

These solutions can be sterilized and can also be used as additives to drinking water for oral administration. The components are stable in the drinking water for several days. The water should preferably contain between about 0.05% to about 5% by weight of the antibacterial compositions.

In addition to the therapeutically active ingredients mentioned heretofore, the injectable solutions of this invention can contain as optional ingredients any of the various adjuvants which are ordinarily used in the preparation of pharmaceutical preparations. Thus, for example, in formulating the injectable solutions one may use, as optional ingredients, preservatives, stabilizers, wetting agents, emulsifiers, salts to modify osmotic pressure and compounds to adjust pH values. It should be understood, however, that these optional ingredients are given by way of example only and that the invention is not restricted to the use thereof. On the contrary, many other such adjuvants can be used in carrying out this invention.

The compositions of this invention can also be used as additives, e.g., in animal feedstuff, in a premix or as a concentrate. The concentration of the composition can, thus, vary within rather wide limits, e.g. from about 50 ppm to about 1,000 ppm, preferably from about 250 ppm to about 500 ppm, for an animal feedstuff and from about 25% to about 50% by weight in a premix.

The basic animal feedstuff can be either such commercially available feed ingredients as cornmeal, alfalfa, fish meal and soya meal or mixtures of various ingredients as, for example, the following recipes:

Feed Recipes

| Feed Ingredient | Parts by weight | | |
|---|---|---|---|
| | Pre-starter Feed | Starter Feed | Grower Feed |
| Powdered milk | 40.00 | 10.00 | 2.0 |
| Maize | 30.50 | 53.50 | 60.50 |
| Sugar | 7.00 | 2.00 | 0.50 |
| Soya | 6.00 | 15.50 | 14.00 |
| Barley | 5.00 | 5.00 | 8.00 |
| Fish meal 63% | 2.00 | 4.50 | 4.00 |
| Fish meal 70% | 2.00 | 2.50 | 3.00 |
| Fat | 2.00 | 2.00 | — |
| Yeast | 1.50 | 1.00 | 1.00 |
| Alfalfa (Lucerne) | 1.00 | 1.00 | 1.00 |
| Dicalcium phosphate | 1.00 | 1.00 | 1.00 |
| Chalk | 0.50 | 0.50 | 0.50 |
| Salt | 0.50 | 0.50 | 0.50 |
| Premix* | 1.00 | 1.00 | 1.50 |
| Bran | — | — | 2.50 |

*The above "premix" contains per kg of finished feed:

| | |
|---|---|
| Vitamin A | 12,000 I.U. |
| Vitamin D$_3$ | 1,600 I.U. |
| Vitamin E | 35 I.U. |
| Vitamin B$_1$ | 5 mg |
| Vitamin B$_2$ | 14 mg |
| Vitamin B$_{12}$ | 50 γ |
| Vitamin C (calcium ascorbate) | 300 mg |
| Calcium pantothenate | 25 mg |
| Choline chloride | 300 mg |
| Nicotinamide | 60 mg |
| as well as trace elements. | |

It should be understood that the concentrations set forth herein are exemplary only and do not limit the scope of practice of the present invention.

A. Preparation of 3-sulfanilamido-4,5-dimethylisoxazole

A mixture of 75 grams of 4,5-dimethylisoxazole, 96 g. of dimethylsulfate and 750 ml. of toluene are maintained at 90°C. for 18.5 hours with constant stirring. The resulting insoluble phase, 184 grams of 2,4,5-trimethyl-isoxazolium methosulfate is separated, dissolved in water and 54 grams of hydroxylamine hydrochloride is added thereto. 192 Grams of a 50% sodium hydroxide solution is added and stirring is continued for one hour at 0°C. The mixture is then allowed to warm to room temperature with stirring for one hour, then heated to 85°C., maintained there for 15 minutes and then cooled. The resulting crystalline mass is 50 grams of 3-methylamino-4,5-dimethylisoxazole.

To 3 grams of this material in 300 ml. of chloroform, 177 grams of manganese dioxide is added. After 2 1/2 hours the mixture is filtered and the insoluble material, 3-formamido-4,5-dimethylisoxazole is dried and then heated with 30% $H_2O_2$ for one hour to yield 0.43 grams of 3-amino-4,5-dimethylisoxazole.

To 8.4 grams of 3-amino-4,5-dimethylisoxazole in 42 ml. of dry pyrimidine are added, with shaking, 16.8 grams of N-acetylsulfanilyl chloride. After standing for one hour at 50°C., 225 ml. of water is added. The mixture cools slowly for two hours to crystallize 18.4 grams of 3(N-acetylsulfanilamido)-4,5-dimethylisoxazole. 17.4 grams of this compound is treated on a steam bath for one hour with 174 ml. of 10% sodium hydroxide. The resulting solution is poured into 348 ml. of boiling water and 42 ml. of acetic acid is added thereto to crystallize 14.3 grams of 3-sulfanilamido-4,5-dimethylisoxazole.

B. Blood half-life Studies

The efficacy of the compositions of the present invention in maintaining prolonged half-life in blood plasma, especially in cows, is demonstrated by the following test.

The following sulfonamide and sulfonamide/potentiator combinations were evaluated:

a. 2-sulfanilamido-4,6-dimethylpyrimidine
b. 5 parts 4-sulfanilamido-5,6-dimethoxypyrimidine + 1 part 2,4-diamino-5-(3,4,5-trimethoxybenzyl)- pyrimidine
c. 5 parts 3-sulfanilamido-4,5-dimethylisoxazole + 1 part 2,4-diamino-5-(3,4,5-trimethoxybenzyl)- pyrimidine 24% injection solutions were prepared containing the combination b) or c) and a 20% injection solution was prepared containing a).

Three cows were used for each evaluation. Each cow was injected intravenously a dosage of 60 mg. of active ingredient per kilogram of body weight (equivalent to 50 mg of sulfonamide) in the case of combinations (b) and (c) or a dosage of 50 mg/kg of body weight in case of sulfonamide a).

Blood samples were taken immediately before the injection and at measured intervals after injection.

The drawn blood was initially mixed with heparin and stored at +4°C. until analysis. Sulfonamide concentrations in blood plasma were determined by the colorimetric method of Bratton and Marshall, J. Biol. Chem. 128, 537 (1939), modified by Probst, H. P. et al., Zentralbl. Veterinarmedizin, Reihe A, 12, 744–760 (1965).

From this date the half-life of the sulfonamides in blood plasma is determined. The half-life is defined as the time for the theoretically initial concentration of sulfonamide in the blood to decrease by one-half (see:

Rehm, W. F. and J. P. Weber: Wien. Tierarztl. Wschr. 53, 499 (1966)). The results are tabulated below.

| Component | Sulfonamide half-life in blood plasma of cows, hours |
|---|---|
| a) 2-sulfanilamido-4,6-dimethyl pyrimidine | 7 |
| b) 4-sulfanilamido-5,6-dimethoxypyrimidine + 2,4-diamino-5-(3,4,5-trimethoxybenzyl) pyrimidine | 9 |
| c) 3-sulfanilamido-4,5-dimethylisoxazole + 2,4-diamino-5-(3,4,5-trimethoxybenzyl) pyrimidine | 15 |

The combination of components A and B hereinbefore is distinguished by a relatively long half-life of component A in blood plasma (especially in cows), the relatively short half-life of component B being compensated to the extent that, after the blood-level of component B falls below a therapeutically active value, component A is still present as a chemotherapeutic in an active dosage in the body for a longer time. By the administration of a maintenance dose, component B becomes active again in conjunction with the still-present and the newly-administered component A. This combination of an intermittent short-duration therapy with a potentiated sulphonamide and of a long-duration therapy with an active sulphonamide enables a relatively low dosage of the combination of components A and B to be used.

C. Anti-Microbial Activity of the Composition

A sufficient amount of a composition comprising 5 parts of 3-sulfanilamido-4,5-dimethylisoxazole and one part of 2,4-diamino-5-(3,4,5-trimethoxybenzyl) pyrimidine is admixed with a commercial food blend for carps to provide 3000 ppm of active ingredient. As a standard a feed blend containing 620 ppm of chloramphenicol, D(-)-threo-2,2-dichloro-N-[β-hydroxy-α-(hydroxymethyl)-p-nitrophenethyl] acetamide, was also prepared. A commercial food blend is given below.

| Ingredient | % by Weight |
|---|---|
| Fish meal | 29.5 |
| White meal | 29.0 |
| Soy bean extract | 9.0 |
| Fodder yeast | 3.0 |
| Tapioca meal | 4.0 |
| Alfalfa-grass-green flour | 3.0 |
| Mineral mixture | 4.5 |
| White food flour | 5.0 |
| Beer grains | 7.0 |
| Animal meal | 2.0 |
| Salt | 1.5 |
| Vitamins A,D$_3$,B$_1$,B$_2$, B$_6$,B$_{12}$,E and C*) | 1.0 |
| Compounding Ingredients | 1.5 |

*)Vitamin C preferably as calcium ascorbate

This meal constitutes 30.15% protein, 5.01% fat and 4.37% carbohydrate.

The medicated food is fed continuously to the fish over the test period. Food consumption per day amounted to 2–4% of fish weight, i.e., a weekly consumption of about 4% of active ingredient per kg. of fish.

Feedstuff containing 620 ppm of chloramphenicol was continuously fed to fish having air bladder inflammation disease. The loss of fish over a 14 day period was 10–30%.

Using the feedstuff containing the composition of this invention, fed for 5 days to fish having the same air bladder inflammation, resulted in an immediate end to fish deaths and no further deaths after the 5 day period.

The following Examples illustrate the invention:

EXAMPLE 1

A feedstuff premix consisting of the ingredients listed below is prepared by adding the ingredients to a planet stirrer or drum mixer and mixing them to obtain a homogeneous distribution.

| Ingredient | (i) | (ii) |
|---|---|---|
| 3-sulfanilamido-4,5-dimethylisoxazole | 41.7% | 20.8% |
| 2,4-diamino-5-(3,4,5-trimethoxybenzyl)-pyrimidine 8.3% | 4.2% | |
| Wheat middlings | 50.0% | 75.0% |

EXAMPLE 2

A solution suitable for veterinary injection uses and having a low water content contains the following ingredients per liter:

204 g of 3-sulfanilamido-4,5-dimethylisoxazole,
40.8 g of 2,4-diamino-5-(3,4,5-trimethoxybenzyl)-pyrimidine,
ca. 31 g of pure sodium hydroxide (q.s. ad pH 8.8-9.2),
250 g of distilled water and
glycerineformal q.s. ad 1000 ml.

The solution is prepared by (a) dissolving the pyrimidine component in glycerineformal with slight warming to about 35°C. under a nitrogen atmosphere; (b) dissolving first the sodium hydroxide and then the sulfonamide in water which has been boiled and deaerated with nitrogen and (c) admixing the two solutions, adjusting the pH to 9.0 ± 0.1 and adjusting the volume to 1,000 ml. with glycerineformal. The solution is then filtered through a Millipore filter of 0.45 mm, poured into 100 ml amber ampoules and finally sterilized for 20 minutes at 120°C.

I claim:

1. A potentiated sulfonamide antibacterial composition wherein the sulfonamide has a prolonged half-life in blood plasma which comprises from about 0.05 parts to about 20 parts by weight of a sulfonamide selected from the class consisting of 3-sulfanilamido-4,5-dimethylisoxazole, and a salt thereof with a pharmaceutically acceptable base and 1 part by weight of a pyrimidine selected from the class consisting of 2,4-diamino-5-(3,4,5-trimethoxybenzyl)-pyrimidine, or a salt thereof with a pharmaceutically acceptable acid.

2. A composition in accordance with claim 1 which comprises from about 1 part to about 20 parts of the sulfonamide to 1 part of the pyrimidine.

3. A composition in accordance with claim 1 which comprises from about 5 parts to about 9 parts of the sulfonamide to 1 part of the pyrimidine.

4. An injectable solution which comprises pharmaceutical adjuvant material and an effective amount of a potentiated sulfonamide antibacterial composition wherein the sulfonamide has a prolonged half-life in blood plasma comprising from about 0.05 parts to about 20 parts by weight of a sulfonamide selected from the class consisting of 3-sulfanilamido-4,5-dimethylisoxazole, and a salt thereof with a pharmaceutically acceptable base and 1 part by weight of a pyrimidine selected from the class consisting of 2,4-diamino-5-(3,4,5-trimethoxybenzyl)-pyrimidine, or a salt thereof with a pharmaceutically acceptable acid.

5. An injectable solution in accordance with claim 4 wherein the antibacterial composition comprises from about 1 part to about 20 parts of the sulfonamide to 1 part of the pyrimidine.

6. An injectable solution in accordance with claim 4 wherein the antibacterial composition comprises from about 5 parts to about 9 parts of the sulfonamide to 1 part of the pyrimidine.

7. An animal feedstuff containing in said feedstuff as an antibacterial agent, an effective amount of a potentiated sulfonamide composition wherein the sulfonamide has a prolonged half-life in blood plasma comprising from about 0.05 parts to about 20 parts by weight of a sulfonamide selected from the class consisting of 3-sulfanilamido-4,5-dimethylisoxazole, and a salt thereof with a pharmaceutically acceptable base and 1 part by weight of a pyrimidine selected from the class consisting of 2,4-diamino-5-(3,4,5-trimethoxybenzyl) pyrimidine, or a salt thereof with a pharmaceutically acceptable acid.

8. An animal feedstuff in accordance with claim 7 wherein the composition comprises from about 1 part to about 20 parts of the sulfonamide to 1 part of the pyrimidine.

9. An animal feedstuff in accordance with claim 7 wherein the composition comprises from about 5 parts to about 9 parts of the sulfonamide to 1 part of the pyrimidine.

10. A method for prolonging the half-life of a sulfonamide in blood plasma of animals afflicted with a bacterial infection susceptible to sulfonamide treatment which comprises treating said animals by administering to the animal an effective amount of a potentiated sulfonamide antibacterial composition which comprises from about 0.05 parts to about 20 parts by weight of a sulfonamide selected from the class consisting of 3-sulfanilamido-4,5-dimethylisoxazole, and a salt thereof with a pharmaceutically acceptable base and 1 part by weight of a pyrimidine selected from the class consisting of 2,4-diamino-5-(3,4,5-trimethoxybenzyl)-pyrimidine, or a salt thereof with a pharmaceutically acceptable acid.

11. A method in accordance with claim 10 wherein the antibacterial composition comprises from about 1 part to about 20 parts of the sulfonamide to 1 part of the pyrimidine.

12. A method in accordance with claim 10 wherein the antibacterial composition comprises from about 5 parts to about 9 parts of the sulfonamide to 1 part of the pyrimidine.

* * * * *